May 31, 1927.
M. W. MEEK
1,630,303
ANIMAL TATTOO MARKING INSTRUMENT
Filed Dec. 31, 1925
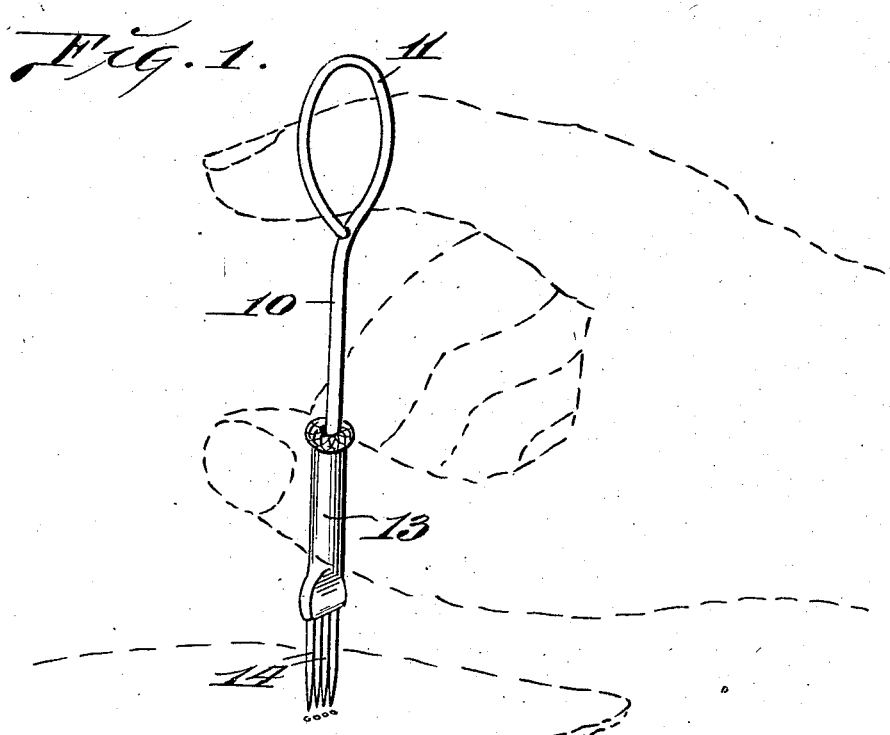
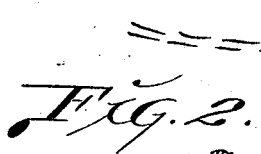
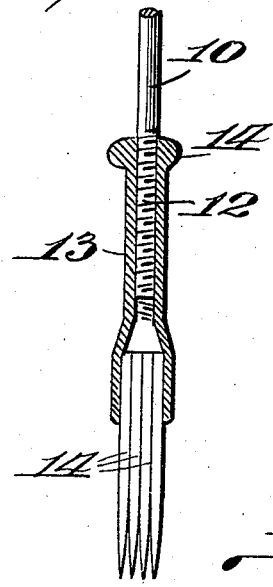
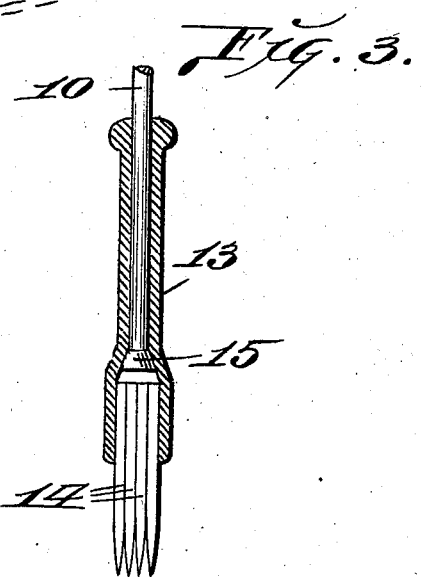
Inventor:—
Marcellus W. Meek.
By Martin P. Smith Atty.

Patented May 31, 1927.

1,630,303

UNITED STATES PATENT OFFICE.

MARCELLUS W. MEEK, OF ARCADIA, CALIFORNIA.

ANIMAL-TATTOO-MARKING INSTRUMENT.

Application filed December 31, 1925. Serial No. 78,526.

My invention relates generally to an animal marking device and more particularly to that type of markers that utilizes the tattoo method of animal identification.

The principal objects of my invention are to provide a tattoo marking device that is relatively simple in construction, capable of being easily and cheaply produced and which may be conveniently handled and manipulated during the marking operations.

A further object of my invention is to provide a device of the character referred to that is especially applicable for applying tattoo marks to the ears of the smaller varieties of fur-bearing animals such as rabbits and foxes.

The practice of marking animals by the tattoo process provides a method of identification that is permanent, humane, inexpensive, and readily accomplished.

With the foregoing and other objects in view, my invention consists in certain novel features of construction and arrangement of parts that will hereinafter be more fully described and claimed and illustrated in the accompanying drawings, in which—

Fig. 1 is a perspective view of an animal marking device embodying the principles of my invention.

Fig. 2 is a vertical section through the center of the needle-carrying member of the device.

Fig. 3 is a sectional view similar to Fig. 2 and showing a modified form of the needle-carrier.

Referring by numerals to the accompanying drawings which illustrate a practical embodiment of my invention, 10 designates a short shank that may be formed of wire, one end of said shank being bent to form a loop 11 of such size as to readily accommodate the end portion of the index finger and the opposite end of the shank 10 is threaded as designated by 12.

An internally threaded tube 13 receives the threaded portion 12 of shank 10 and the upper end of tube 13 is provided with an integral flange or head 14ª, the peripheral surface of which may be milled or corrugated. The threaded connection between the threaded portion of shank 10 and the tube 13 enables the latter to be readily rotated in either direction when the device is used and in this connection it will be understood that the tubular member is not screwed tightly upon the threaded portion of the shank, but that the threaded engagement of the parts provides a simple form of connection and at the same time permits the needle carrying tube to be readily rotated between the thumb and second finger when the device is used for tattooing purposes. The lower portion of tubular member 13 is flattened and seated therein and rigidly fixed by means of solder or the like are the upper or blunt ends of a series of needles or puncturing members 14.

In the modified form of the device illustrated in Fig. 3, the tubular portion 13 of the needle carrier is mounted to rotate freely on the unthreaded lower end of shank 10 and the terminal portion of said shank 10 is provided with a head 15 that occupies a corresponding recess in member 13 at the upper end of the flattened lower portion thereof.

I prefer to arrange the tattoo needles 14 in a straight row as illustrated in the drawings, but it will be understood that the number of needles may be increased and that they may be arranged so as to form the outline of any letter, figure, or symbol.

In the use of my improved tattoo marking instrument, the end portion of the index finger is placed through loop 11 and the flange or head 14ª on the upper end of the tubular needle carrier is engaged between the ball of the thumb and the end of the second finger. When so engaged the instrument may be readily and conveniently manipulated so as to force the points of the needles beneath the skin of an animal's ear and the tubular needle carrier may be readily rotated to properly position the needles in forming the outlines of letters, figures, or symbols.

It will be understod of course that prior to the insertion of the needles beneath the skin the points of said needles are dipped in the tattooing liquid, usually a permanent ink, and commercially known as india ink.

An animal marking instrument of my improved construction is comparatively simple in construction, may be easily and cheaply produced, may be conveniently manipulated and is very effective in performing its intended functions.

It will be understood that minor changes in the size, form and construction of the various parts of my improved animal tattoo marking instrument may be made and substituted for those herein shown and described without departing from the spirit of my invention, the scope of which is set forth in the appended claims.

I claim as my invention:

1. A tattoo marking implement comprising a shank, a finger-receiving loop on one end thereof, a tubular member mounted for rotation on the other end of said shank, a series of needles carried by the rotatably mounted member and a flange on the upper end of said rotatably mounted member.

2. In a tattoo marking implement, a shank provided at one end with a finger-receiving loop, a tubular member mounted for rotation on the other end of the shank, a flange formed on the upper end of said tubular member, the lower end of the tubular member being flattened and a series of needles seated in the flattened end of said tubular member.

3. A tattoo marking implement comprising a shank, one end of which terminates in a finger-receiving loop, a member mounted to rotate freely upon the other end of the shank and a series of needles carried by the rotatably mounted member which needles are arranged in a straight row.

In testimony whereof I affix my signature.

MARCELLUS W. MEEK.